United States Patent

Wheeler et al.

(10) Patent No.: US 7,938,901 B2
(45) Date of Patent: May 10, 2011

(54) METAL PIGMENT COMPOSITION

(75) Inventors: Ian Robert Wheeler, Kinross (GB); Michael Richard Kryszczuk, Fife (GB)

(73) Assignee: Silberline Limited, Leven, Fife (GB)

( * ) Notice: Subject to any disclaimer, the term of this patent is extended or adjusted under 35 U.S.C. 154(b) by 222 days.

(21) Appl. No.: 10/551,774

(22) PCT Filed: Mar. 31, 2004

(86) PCT No.: PCT/GB2004/001353
§ 371 (c)(1),
(2), (4) Date: Oct. 3, 2005

(87) PCT Pub. No.: WO2004/087817
PCT Pub. Date: Oct. 14, 2004

(65) Prior Publication Data
US 2007/0051272 A1    Mar. 8, 2007

(30) Foreign Application Priority Data
Apr. 4, 2003   (GB) .................................. 0307890.4

(51) Int. Cl.
C09C 1/62 (2006.01)
C09D 11/00 (2006.01)
C08K 5/00 (2006.01)
C08K 9/10 (2006.01)
C08K 9/12 (2006.01)
C08K 3/08 (2006.01)
H01B 1/22 (2006.01)
B27N 3/00 (2006.01)

(52) U.S. Cl. ........ 106/403; 106/31.9; 106/404; 106/499; 523/160; 523/161; 523/171; 523/210; 524/439; 524/440; 524/441; 264/109; 419/61

(58) Field of Classification Search ................. 106/31.9, 106/403, 404, 499; 523/200, 160, 161, 171, 523/210; 524/439, 440, 441; 264/109; 419/61
See application file for complete search history.

(56) References Cited

U.S. PATENT DOCUMENTS

| 3,511,648 A | * | 5/1970 | Garrett ............................ 430/87 |
| 3,619,233 A | * | 11/1971 | Hipp et al. ..................... 427/190 |
| 3,790,407 A | * | 2/1974 | Merten et al. ................. 428/148 |
| 3,901,688 A | | 8/1975 | Casey et al. |
| 4,007,138 A | * | 2/1977 | Kanig .............................. 521/29 |
| 4,318,747 A | | 3/1982 | Ishijima et al. |
| 4,486,225 A | | 12/1984 | Osborn et al. |
| 4,588,474 A | * | 5/1986 | Gross ........................... 216/102 |
| 4,629,512 A | * | 12/1986 | Kondis ......................... 106/404 |
| 4,725,317 A | * | 2/1988 | Wheeler ....................... 106/403 |
| 4,820,552 A | * | 4/1989 | Espinosa-C. et al. ......... 427/216 |
| 5,071,794 A | * | 12/1991 | Shaikh ........................... 501/17 |
| 5,849,072 A | | 12/1998 | Somer et al. ................. 106/403 |
| 5,879,436 A | * | 3/1999 | Kramer et al. ............. 106/14.42 |
| 6,210,474 B1 | * | 4/2001 | Romano et al. ............. 106/31.6 |
| 6,398,861 B1 | * | 6/2002 | Knox ........................... 106/404 |
| 6,680,070 B1 | * | 1/2004 | Howarth et al. ............. 424/484 |
| 2002/0047058 A1 | * | 4/2002 | Verhoff et al. ................. 241/26 |
| 2002/0117080 A1 | * | 8/2002 | Okutsu et al. ............. 106/31.78 |

FOREIGN PATENT DOCUMENTS

| EP | 0 134 676 A1 | 3/1985 |
| EP | 0 289 240 A1 | 11/1988 |
| EP | 0 668 894 | 8/1995 |
| EP | 0 826 745 A2 | 3/1998 |
| EP | 0 936 253 | 8/1999 |
| EP | 1 142 962 A1 | 10/2001 |
| EP | 1142692 A1 | 10/2001 |
| GB | 2 292 744 A | 3/1996 |
| JP | 53-45331 | 4/1978 |
| WO | WO 94/28074 | 12/1994 |
| WO | WO 98/17731 | 4/1998 |

OTHER PUBLICATIONS

International Search Report, Written Opinion of the International Searching Authority and International Preliminary Report on Patentability Issued in Connection with PCT/GB2004/001353.

* cited by examiner

*Primary Examiner* — Anthony J Green
*Assistant Examiner* — Pegah Parvini
(74) *Attorney, Agent, or Firm* — Nixon & Vanderhye P.C.

(57) ABSTRACT

Process for producing a low volatility metal flake pigment composition, which comprises milling metal powder in a non-aqueous, non-hydrocarbon, low volatility milling fluid.

25 Claims, No Drawings

METAL PIGMENT COMPOSITION

The present invention is a 371 of PCT/GB04/01353 filed Mar. 31, 2004.

The present invention relates to a process for preparing low- or non-dusting, substantially non-volatile metal pigment compositions by a milling process using a non-hydrocarbon milling fluid.

The preparation of metal flake pigments is well documented in the patent literature. Metal flakes can be prepared in the complete absence of solvent by a dry ball milling process, but this can be hazardous in the case of reactive metals such as the widely employed aluminium, due to the contaminating and/or explosive properties of the dry flake products.

Wet ball milling processes are also known in which metal powder or chopped foil is milled with an organic liquid such as mineral spirits and a small amount of a lubricant. However, the solvent portion of such metal pigment pastes is especially disadvantageous in printed films on packaging intended for food contact and the presence of organic solvent can also cause bubbles and surface blemishes in the pigmented plastic articles. It is also found that the storage stability of metal pigment pastes themselves is limited, due to the tendency of the organic solvent component to evaporate, leading to aggregation of the metal flake particles.

Environmental concern over volatile organic solvents in industrial processes has led to pressure for their elimination from metal flake pigment manufacturing processes and products and requires expensive equipment for solvent capture.

The need for a stable, safe and easily handled metal pigment product form has been met by the products of European Patent 0134676B1. There is described therein a process for the preparation of a solid, low- or non-dusting, metal pigment composition, which comprises forming a coherent paste of an organic binder medium, an organic liquid vehicle and metal pigment, in powder or flake form. The coherent paste is either sub-divided into particles and substantially all the organic liquid removed, or substantially all the organic liquid vehicle is removed from the coherent paste and the resulting mass sub-divided into particles.

The problem of metal flake dusting may be reduced if the metal powder precursor is milled in the presence of a suitable organic carrier material. However, methods traditionally used to separate wanted from unwanted particle size fractions, such as dilution with solvent, followed by wet screening, are then no longer operable at the dilutions necessary for efficient separation.

At first sight, water appears to be a more satisfactory processing liquid. It is readily available, inexpensive and non-flammable. However, a difficulty arises in the case of the more reactive metal pigments, especially aluminium, which is the most widely used of such pigments. Finely divided aluminium metal may react with water to form aluminium oxide and hydrogen gas and the pigmentary properties of the metal flake are destroyed.

In European Patent 0934365B1 there is described the milling of aluminium powder in a milling fluid consisting substantially of water, in the presence of one or more additives, which together exhibit lubricating, corrosion inhibiting and surfactant properties. The milled material is subsequently converted into a low-or non-dusting, substantially non-volatile, metal flake pigment composition. However, the unpredictability of the aluminium reaction with water means that product integrity cannot always be guaranteed. There therefore remains a need for a fully satisfactory, commercially viable process that can be used to prepare aluminium and other metal pigments in the substantial absence of both water and hydrocarbon solvents, whilst affording appropriate covering power, opacity, gloss and other desirable properties of metal flake pigments and preserving the stability of the product.

Thus, according to the present invention, there is provided a process for preparing a low volatility metal flake pigment composition, which comprises milling metal powder in a non-aqueous, non-hydrocarbon milling fluid, optionally in the presence of one or more substances that act as a lubricant and/or corrosion inhibitor. By non-hydrocarbon is meant an organic liquid that contains elements such as oxygen or nitrogen, in addition to hydrogen and carbon.

In one aspect the process comprises milling a mixture consisting of metal powder and a non-aqueous, non-hydrocarbon, low volatility milling fluid and optionally one or more of a binder, corrosion inhibitor and/or lubricant.

After milling, unwanted oversize or undersize particles may be removed, for example by screening, before the metal pigment slurry is concentrated to a metal flake pigment paste of typically 50 to 90% metal by weight. Such a paste may be sold as prepared, or may desirably be converted into a non-dusting, easily meterable granule form (also known as pellets).

To prepare the latter, an organic binder may be incorporated in the metal pigment paste by mixing, optionally at elevated temperature, to form a coherent paste of organic binder, milling fluid and metal flake pigment. The paste, which typically contains from 3 to 70% of organic binder, based on the weight of the metal flake, may be sub-divided into particles, each containing a plurality of metal pigment particles dispersed and bound in a matrix of organic binder and milling fluid. Preferably, at least 98% by weight of the particles are retained on a sieve having a 150 µm aperture. If desired, part or all of the milling fluid may be removed at elevated temperature, for example to improve granule integrity.

There is a considerable commercial advantage through reduced stockholding if one product can be employed satisfactorily in both solvent-based and water-based coatings and potentially also in mass-pigmented plastics. Such a metal flake pigment product is obtained if a milling fluid is used that is not only both solvent and water miscible, but acts as a plasticiser in plastics. Such fluids are desirably also of low toxicity and odour, but also substantially non-volatile at ambient temperature, thereby limiting losses to atmosphere during manufacture, storage and use. Aggregation of metal flakes, due to fluid loss by evaporation, which causes reduced aesthetic performance, is also thereby avoided. Low volatility extends to the application. For example, in inks or paints, the milling fluid may be substantially retained in the coating, rather than being lost to atmosphere in the conventional drying of such coatings. Certain milling fluids may also be substantially retained in thermoplastics at their processing temperature.

Another advantage of the process of the present invention is the ability to treat the milled flakes whilst in the milling fluid. This may be for a variety of purposes. For example, to improve stability in aqueous application media, phosphates, aluminium or silicon compounds, such as silica or alumina, or chromates, such as ammonium dichromate, may be employed during or after milling. Other treatments, such as with ammonium or potassium permanganate, may be used to provide coloration of the flake surface, for example to simulate gold. Still further treatments may improve the hardness and therefore the shear resistance of such flakes in application media.

There can be benefits in the properties of the finished particles if a thermal post-treatment is applied after the milling step.

The product of the milling step may be added to surface coating binders dissolved or dispersed in water, solvent or mixtures of the two, to prepare a surface coating, such as an ink or paint. The reaction of certain metal flake pigments, notably aluminium, is, however unpredictable. Where such a surface coating contains a proportion of water, there exists the possibility that reactions may occur during storage, with the formation of hydrogen gas with the aforementioned hazards. It is therefore desirable to passivate the metal flake during its preparation, through the addition of one or more corrosion inhibiting agents to the milling system.

The milling fluid of the present invention should comply with the following highly desirable requirements, plus as many desirable characteristics as possible.

Highly desirable requirements are that the milling fluid is:
- of low viscosity; <100 cP, for instance <50 cP, preferably less than 20 cP, and especially of the order of 10 cP or even below at 25° C. Too high a viscosity may extend the milling time, thereby increasing the cost of production.
- liquid in the temperature range of 10-40° C. normally encountered in metal pigment manufacture,
- chemically unreactive with the metal pigment being prepared. This could eliminate halogen groups, which may react violently with certain metals in finely divided form, unless in the presence of a corrosion inhibitor.
- of low odour,
- of low toxicity,
- of low vapour pressure, ideally below 1 mm Hg at 25° C. and preferably below 0.1 mm Hg at 25° C. This characteristic limits losses to atmosphere through evaporation and helps to prevent the resulting aggregation of the paste product.

Desirable characteristics of the milling fluid include:
- optical transparency,
- zero odour,
- non-flammability,
- non-classification for supply and transport by the EU and other jurisdictions.

Milling fluids suitable for the process of the invention are low-medium molecular weight alcohols, glycols, ethers and esters, plus certain ketonic species and hetero atom-containing compounds.

Amongst alcohols there may be mentioned pentyl and hexyl alcohols, 2(2-n-butoxy ethoxy ethanol), tetrahydropyran and tetrahydropyran-2-methanol, whilst glycols may comprise, amongst others, ethylene glycol, dimethylene glycol, diethylene glycol, trimethylene glycol, triethylene glycol, propylene glycols, butylene glycols and glycerol.

Gamma butyrolactone, 2-pyrrolidone, N-methylpyrrolidone, isophorone, triacetin, 2,5,hexanedione, tetraethylene pentamine, triethyl phosphate, ethyl acetoacetate and n-methyl formamide may have utility in some systems. Propylene carbonate is also suitable.

Also suitable for the process of the invention are the lower mono and dialkyl ethers, esters and mixed ether esters of mono-, di- and tri-ethylene and propylene glycols. Examples of ethers are ethylene glycol monobutyl ether, diethylene glycol monomethyl, monoethyl, monopropyl and monobutyl ethers, triethylene glycol monomethyl, monoethyl, monopropyl and monobutyl ethers, diethylene glycol dimethyl, diethyl, dipropyl and dibutyl ethers, triethylene glycol dimethyl, diethyl, dipropyl and dibutyl ethers, propylene glycol monobutyl ether, dipropylene glycol monomethyl, monoethyl, monopropyl and monobutyl ethers, tripropylene glycol monomethyl, monoethyl, monopropyl and monobutyl ethers, dipropylene glycol dimethyl, diethyl, dipropyl and dibutyl ethers, and tripropylene glycol dimethyl, diethyl, dipropyl and dibutyl ethers. Diamyl ether may also be used.

Examples of esters and mixed ether esters are methoxypropyl acetate, ethylene glycol monobutyl ether acetate, diethylene glycol monomethyl ether acetate, diethylene glycol monoethyl ether acetate, diethylene glycol monobutyl ether acetate, dipropylene glycol monomethyl ether acetate and propylene glycol diacetate. Methyl, ethyl and propyl lactate plus the monomethyl, monoethyl, dimethyl and diethyl esters of succinic, glutaric and adipic acids may also be used. Mixtures of any of the above milling liquids may be used.

Aforementioned compounds displaying low nominal water solubility may yet be suitable in water-based application systems because they may act as bridging solvents where there is also some water-miscible organic solvent present in the formulation.

Particularly preferred are propylene carbonate, dipropylene glycol dimethyl ether, commercially available as Dow Proglyde DMM, (Dow Proglyde DMM is a trademark of the Dow Chemical Company), diethylene glycol monoethyl ether acetate, sold as DE Acetate (Eastman DE acetate is a trade name of the Eastman Chemical Company), dipropylene glycol n-propyl ether, sold as Dowanol DPnP, (Dowanol DPnP is a trade name of the Dow Chemical Company), tripropylene glycol methyl ether, sold as Dowanol TPM, (Dowanol TPM is a trade name of the Dow Chemical Company), diethylene glycol monobutyl ether acetate, sold by Union Carbide Corporation as butyl Carbitol acetate, (Carbitol is a trademark of the Union Carbide Corporation), a mixture of dimethyl esters of adipic, glutaric and succinic acids, supplied by DuPont under the trade name DBE.

Metals suitable for the performance of the invention include all those metals and alloys commercially employed as flake pigments, such as aluminium, zinc, copper, tin, nickel, silver, gold, iron and alloys thereof, such as gold bronze, an alloy of copper and zinc, or stainless steel, an alloy composed mainly of iron. Aluminium and gold bronze are preferred, as they have the greatest commercial potential. There is no criticality to the particle size of the milled flakes, but a median flake diameter range of 6 μm to 600 μm, preferably 10 μm to 300 μm, is generally suitable.

Although not essential to the performance of the invention, where the product of the invention is intended for use in water-based systems, it is desirable to include corrosion inhibitors in the comminution of the more chemically reactive metals, such as aluminium. Any compounds capable of inhibiting the reaction of the metal with water may be employed as corrosion inhibitors. Examples are phosphorus-, chromium-, vanadium-, molybdenum-, tungsten-, zirconium-, titanium- or silicon-containing compounds and heteropolyanionic compounds thereof. They may be used individually or in admixture, with addition before, during or after milling.

Suitable phosphorus compounds may be organic or inorganic. Simple inorganic phosphates, such as calcium or magnesium phosphate, or more complex phosphosilicate compounds may be used. The latter include calcium phosphosilicate, calcium strontium phosphosilicate and aluminium zirconium zinc phosphosilicate. An especially preferred member of this class is calcium strontium zinc phosphosilicate.

Organic phosphorus compounds include alkyl and dialkyl phosphates, phosphonic acids and their derivatives. Such alkyl and dialkyl groups may contain 1-20 carbon atoms. Iso-octyl acid phosphate, octyl phosphonic acid, lauryl phosphonic acid, and lauryl phosphate may be particularly mentioned. Also especially suitable are phosphate esters of long chain ethoxylated alcohols.

Silicon containing compounds capable of inhibiting the reaction of metals with water include organic silanes and silicates, especially tetra ethyl silicate and inorganic silicon compounds such as potassium silicate.

Compounds of molybdenum, vanadium, titanium and tungsten, especially molybdic acid, some ammonium salts and alkaline and alkaline earth salts, have also shown particular suitability in the process of the invention.

Chromium compounds that may be employed in the invention include ammonium dichromate and chromic acid. In this class, the former is preferred as it is less aggressive towards metal grinding media.

Amongst the above corrosion inhibiting compounds, non-resinous organic or inorganic phosphates are especially preferred. They generally offer a high level of corrosion resistance, with few health and safety concerns.

Long chain fatty acids, especially stearic and oleic acids, have traditionally been used as lubricants in the conventional hydrocarbon solvent-based milling process. Such lubricants are generally added at a few percent by weight, calculated on the metal weight. They have the effect of preventing cold welding of incipient metal flakes under the action of the milling media. It is an advantage of the present invention that certain milling fluids do not require the addition of a lubricant. Apart from avoidance of lubricant cost, the collection and reuse of solvent is thereby facilitated. Where there is advantage in their use, lubricants suitable for the process of the invention are generally organic compounds recognised in the art as having both lubrication properties and imparting corrosion resistance and/or adhesion properties in application. Amongst those compounds imparting particularly good adhesion properties are mineral oils, also known as white oils, which are hydrocarbons having boiling points in the range of 180 to 300° C.

The corrosion inhibitor and milling lubricant functions may be advantageously provided by a single chemical substance, for example a phosphated ester of ethoxylated alcohols. Alternatively the functions may be provided by two or more different materials. Such compounds may also improve adhesion to the substrate when the products of the invention are used in coating applications.

There is no criticality to the mechanism of milling. Any comminution process known in the art for metal flake production may be employed, providing the mechanical energy imparted is not so severe as to damage the metal flakes being formed. Ball milling is a widely operated process.

Neither is there any criticality to the grinding media, providing they do not undergo undesirable chemical reactions with the other components during or after the comminution stage of the process. Steel, glass and high-density ceramic grinding media are generally satisfactory.

Unwanted oversize or undersize metal flake particles may be removed by any suitable means, such as screening of the milled slurry, optionally diluted by more milling fluid. The metal pigment slurry can then be concentrated to a paste by any convenient means, such as a filter press, ready for sale as a paste. Alternatively, it may be admixed with organic binder medium and formed into granules.

Organic binder media include those organic materials habitually employed as binders in paints and inks or as plastics masterbatch carriers. The organic binder chosen is dependent on the envisaged end use of the product of the invention. If the derived granules are to be capable of use in both water-based and solvent-based application systems, the organic binder should be compatible with both systems. Many acrylic and related resins are solvent soluble, but become water soluble on neutralisation with a suitable amine.

Alternatively, if desired, the organic binder medium may specifically be a solvent-soluble resin. As examples of such media there may be mentioned cellulose acetate butyrate (CAB) and cellulose acetate propionate (CAP) resins, coumarone indene, epoxy esters, epoxide melamine and epoxide phenolic condensates, ketone, aldehyde, maleic and phenolic resins and also rosin, cellulose and petroleum derived resins, together with thermoplastic polymers, such as polyacrylates, polyolefins, polyvinyls, styrenics, polyamides, polyesters and copolymers thereof. Also suitable are natural and synthetic waxes, such as montan and paraffin wax and synthetic waxes such as polyethylene and polypropylene waxes.

Where it is desired to introduce liquid organic binders, such as plasticisers, for example to improve application properties, they are desirably added in minor proportions in combination with solid resins, to retain structural rigidity in the resulting granules. Such plasticisers include mineral oils as well as phthalates such as dioctyl or di-isodecyl phthalate, and adipates, such as dioctyl adipate.

Amongst organic binders suitable for water-based application systems, gelatin and carrageenan may be mentioned. Some surfactants may also be used, though care must be taken that the adhesion of derived coatings to the application substrate is not impaired.

It is an advantage of the granule-forming stage of the process that it is not generally necessary to pre-dissolve or pre-disperse organic binders in solvent. Indeed it may be undesirable to do so, as the viscosity may be reduced too much to provide granules of satisfactory structural integrity. Rather, dry organic binder may be added to the metal pigment paste, heating if necessary to achieve a homogenous mass, capable of formation into granules without substantial removal of the milling fluid. In some applications, the presence of milling fluid may be undesirable. For example, the application properties of some printing inks may be adversely affected. In such cases the milling fluid may be removed at elevated temperature, optionally under vacuum.

Granular products of the invention are typically in a form such as tablet, pellet, granule, flake or spherical bead, which provides the attributes of ease of handling, non-dusting and meterability. Granules having a length of 5 to 20 mm, and a thickness of 1.5 to 3 mm are preferred, as they have been found to offer optimum handling characteristics, especially in plastics applications where it is important to prevent stratification of polymer pellets and the more dense products of the invention. Apparatus used for the preparation of such physical forms is well known to those skilled in the art and is described in, for example, European Patent 0134676B1.

The function of the organic binder medium is to immobilise the metal pigment flakes to prevent them becoming airborne as dust. Where the organic binder medium is insoluble in the milling fluid, it may be preferable to micronise the binder, that is to say, reduce its particle size to the micron size range. In this latter case, the coherent paste of metal pigment, milling fluid and micronised organic binder medium is formed into particles, for example by mixing and extrusion, then heat treated at elevated temperature, for example 100 to 130° C. for a short time, to fuse together the micronised organic binder medium and the metal flake pigment. This process is particularly suited to products for the plastics market, in which suitable organic binder media may be insoluble in the milling fluid. It provides a final product form that has excellent colouristic and application properties when used in the injection moulding or extrusion of thermoplastics.

The invention is further illustrated by the following Examples in which all parts and percentages are by weight, unless otherwise stated.

EXAMPLE 1

The following materials were added to a rigid cylindrical polypropylene container of volume one litre:
1607 g of 3 mm diameter stainless steel balls
207 g of butyl Carbitol acetate
30 g of aluminium powder of approximately 7 μm median particle diameter
2.1 g of oleic acid The sealed container and contents were put on a vibratory mill. After three hours, the mill contents were removed and separated from the steel balls by sieving, prior to recovery by vacuum filtration using a Buchner funnel. The aluminium pigment flakes produced were then incorporated into both a solvent based and a water-based acrylic ink system and drawn down onto paper using a wire-wound bar. A bright metallic appearance with good coverage was obtained in both ink systems.

EXAMPLE 2

The following mixture was milled for three hours in a vibratory mill, sieved and concentrated by vacuum filtration as described in Example 1:
1607 g of 3 mm diameter stainless steel balls
207 g of Proglyde DMM
30 g of a fine aluminium powder of approx. 7 μm median particle diameter
2.1 g of Briphos S2D, a phosphated ester of ethoxylated $C_{12-15}$ alcohols, (Briphos is a trademark of Rhodia), which had been neutralised with triethanolamine.

The resulting pigment flakes were then incorporated into both a solvent based and a water based acrylic ink system and drawn down. A bright ink, with a good metallic appearance and good coverage was obtained in both ink systems.

The corrosion resistance of this aluminium pigment was tested by measuring the gas evolved when formulated in an acrylic coating system, Joncryl 537, and stored for one week at 52° C. (Joncryl 537 is a dispersion of an acrylic copolymer in water. Joncryl is a trademark of S.C. Johnson & Son Inc.) The amount of gas evolved, for 10 g of this metallic pigment (as solids) in 150 g of Joncryl 537 and 50 g of water was 8.6 ml This indicated that the aluminium flake surfaces were well protected from reaction with water.

EXAMPLE 3

The following mixture was milled for three hours in a vibratory mill, sieved and concentrated by vacuum filtration as described in Example 1:
16079 of 3 mm diameter stainless steel balls
207 g of Dowanol TPM
30 g of aluminium powder of approx. 7 μm median particle diameter No lubricant was added to this mill formulation. The aluminium pigment flakes produced were incorporated into both a solvent based and a water based acrylic ink system and drawn down. A bright metallic ink, with good coverage was obtained in both systems.

EXAMPLE 4

The following mixture was milled for three hours in a vibratory mill, sieved and concentrated by vacuum filtration as described in Example 1:
1607 g of 3 mm diameter stainless steel balls
207 g of Eastman DE acetate
30 g of aluminium powder of approximately 7 μm median particle diameter
2.1 g of stearic acid The aluminium pigment flakes produced were incorporated into both a solvent based and a water based acrylic ink system and drawn down. A bright ink, with good coverage was obtained in both ink systems.

EXAMPLE 5

The following mixture was milled for three hours in a vibratory mill, sieved and concentrated by vacuum filtration as described in Example 1:
1607 g of 3 mm diameter stainless steel balls
207 g of butyl Carbitol acetate
30 g of aluminium powder of approximately 7 μm median particle diameter
2.1 g of mineral oil Mineral oil is a saturated hydrocarbon of low volatility, having a vapour pressure of approximately 0.001 mm Hg.

The aluminium pigment flakes produced were incorporated into both solvent based and water based acrylic ink systems and drawn down. A bright metallic appearance ink, with a good coverage and good adhesion on a tape removal test was obtained in both ink systems.

EXAMPLE 6

The following mixture was milled for three hours in a vibratory mill, sieved and followed by pigment concentration by vacuum filtration as described in Example 1:
1607 g of 3 mm diameter stainless steel balls
207 g of DuPont DBE
0.30 g of aluminium powder of approximately 7 μm median particle diameter
2.1 g of oleic acid The aluminium pigment flakes produced were incorporated into both a solvent based and a water based acrylic ink system and drawn down. A bright metallic ink, with good coverage and good adhesion on a tape removal test was obtained in both systems.

EXAMPLE 7

The following mixture was milled for five hours in a vibratory mill, sieved and followed by pigment concentration by vacuum filtration as described in Example 1:
1607 g of 3 mm diameter stainless steel balls
207 g of Dowanol Proglyde DMM
60 g of copper powder
2.1 g of stearic acid The resultant copper pigment flakes produced were then incorporated into both a solvent based and a water based acrylic ink system and drawn down. A bright copper coloured ink effect was obtained with both ink systems.

EXAMPLE 8

The following mixture was milled in a vibratory mill for five hours, sieved and followed by pigment concentration by vacuum filtration. As in Example 1:
1607 g of 3 mm diameter stainless steel balls
207 g of Dowanol Proglyde DMM
60 g of iron powder of approximate median diameter of 16 μm
2.1 g of oleic acid The resultant pigment flakes produced were then incorporated into both a solvent based and a water based ink system. A metallic, gunmetal colour effect was obtained with both ink systems.

EXAMPLE 9

The following mixture was milled in a vibratory mill, sieved and concentrated by vacuum filtration as described in Example 1:
1607 g of 3 mm diameter stainless steel balls
207 g of Dowanol TPM
30 g of aluminium powder of median particle size of approximately 7 μm
2.1 g of lauryl phosphate The aluminium pigment flakes produced were then incorporated into a water based acrylic ink system and drawn down. A bright metallic effect ink, with good coverage was obtained.

EXAMPLE 10

The following mixture was milled in a vibratory mill, sieved and concentrated by vacuum filtration, as described in Example 1:
1607 g of 3 mm diameter stainless steel balls
207 g of Eastman DE Acetate
30 g of aluminium powder of median particle size of approximately 7 μm
2.1 g of octadecyl phosphonic acid The aluminium pigment flakes produced were incorporated into both a solvent based and a water based ink system and drawn down. A bright metallic appearance ink, with good coverage was obtained in both systems.

EXAMPLE 11

The following mixture was milled in a vibratory mill sieved and concentrated by vacuum filtration as described in Example 1:
1607 g of 3 mm diameter stainless steel balls
207 g of Dupont DBE
30 g of aluminium powder of median particle size of approximately 7 μm
2.1 g of lauryl phosphonic acid. Lauryl phosphonic acid was supplied by Rhodia.

The aluminium pigment flakes produced were incorporated into both a solvent based and a water based acrylic ink system and drawn down. A bright ink, with good coverage was obtained in both systems.

EXAMPLE 12

The following mixture was milled in a vibratory mill, sieved and concentrated by vacuum filtration, as described in Example 1:
1607 g of 3 mm diameter stainless steel balls
207 g of propylene carbonate
30 g of aluminium powder of median particle size of approximately 7 μm
2.1 g of oleic acid The aluminium pigment flakes produced were incorporated into both a solvent based and a water based acrylic ink system and drawn down. A bright metallic appearance ink, with good coverage was obtained in both systems.

EXAMPLE 13

The following mixture was milled for ten hours in a sealed, cylindrical pot of 30 cm diameter, set on revolving rollers. The resulting slurry was sieved and concentrated by vacuum filtration as described in Example 1:
3330 g of 3 mm diameter stainless steel balls
428.5 g of Eastman DE acetate
62.2 g of aluminium powder of approximately 7 μm median particle diameter.

35.4 g of this paste product, containing 20 g of aluminium metal, was added to 5.0 g Laropal K80 resin (BASF GmbH) and the mixture heated to 75° C. for 30 minutes, with gentle stirring to provide a homogenous mixture. The mixture was forced through a perforated mesh to give granules of approx. 10 mm length and 2 mm thickness.

The resultant granules were dispersed in an ethyl acetate-based acrylic ink system by slow speed paddle stirring, then drawn down against the feed paste at equal metal content, similarly dispersed. The drawdown showed that the granulated material was very similar in appearance to the feed paste. The physical form of the granule made it more easily handled than the paste.

EXAMPLE 14

The following mixture was milled in a vibratory mill for 6 hours, sieved and concentrated by vacuum filtration as described in Example 1:
1607 g of 3 mm diameter stainless steel balls
207 g of Eastman DE acetate
30 g of aluminium powder of median particle size of approximately 7 μm
2.1 g of oleic acid 15.2 g of the thus formed aluminium paste, containing 10 g of aluminium metal, was added to 3.2 g low molecular weight polyethylene wax granules and the mixture heated at 100° C. for 1 hour whilst gently mixing to provide a homogenous mixture. The mixture was granulated and recovered as described in Example 13.

The resultant granules were incorporated at 1.0% by weight in polypropylene in an injection-moulding machine held at approximately 220° C. The moulded articles exhibited a smooth, uniformly pigmented, silver surface, with no obvious defects. The granule was more easily handled than the feed paste.

EXAMPLE 15

The following mixture was milled in a vibratory mill for 3 hours as described in Example 1, then sieved to remove the grinding media.
1607 g of 3 mm diameter stainless steel balls
207 g of Dowanol DPnP
30 g of aluminium powder of approximately 7 μm median particle diameter
2.1 g of oleic acid.

The resulting aluminium flake pigment slurry was then maintained at 110° C. for 2 hours, then cooled and concentrated by filtration. The paste so formed, containing 10 g of aluminium metal, was dispersed in 150 g of Joncryl 537 and 50 g of water. Corrosion resistance was tested by measuring the gas evolved when formulated in this acrylic coating system and stored for one week at 52° C. The amount of gas evolved was 12.4 ml. This indicated that the aluminium flake surfaces were well protected from reaction with water.

The paste product was also tested in water- and solvent-based paints, applied to card by drawdown. A bright metallic appearance with good coverage was obtained in both systems.

EXAMPLE 16

The following mixture was milled for ten hours in a sealed, cylindrical pot of 30 cm diameter, set on revolving rollers. The resulting slurry was sieved and concentrated by vacuum filtration as described in Example 1:
1607 g of 3 mm diameter stainless steel balls
207 g of Dowanol DPnP
30 g of aluminium powder of approx. 10 μm median particle diameter No lubricant was added to this mill formulation. The aluminium pigment flakes produced were incorporated into both a solvent based and a water based acrylic ink system and drawn down. A bright metallic ink, with good coverage was obtained in both systems.

35 g of the thus formed aluminium paste, containing 20 g of aluminium metal, were added to 3 g of calcium strontium zinc phosphosilicate and mixed until homogenous. The corrosion resistance of a quantity of this mixture containing 10 g of aluminium metal was tested by measuring the gas evolved when formulated in an aqueous acrylic coating system, Joncryl 537, and stored for one week at 52° C. The amount of gas evolved was 3.5 ml. This indicated that the aluminium flake surfaces were well protected from reaction with water.

EXAMPLE 17

The following mixture was milled for ten hours in a sealed, cylindrical pot of 30 cm diameter, set on revolving rollers. The resulting slurry was sieved and concentrated by vacuum filtration as described in Example 1:
3330 g of 3 mm diameter stainless steel balls
428.5 g of Dowanol DPnP
62.2 g of aluminium powder of approximately 7 μm median particle diameter.

No lubricant was added to this mill formulation. The aluminium pigment flakes produced were incorporated into both a solvent based and a water based acrylic ink system and drawn down. A bright metallic ink, with good coverage was obtained in both systems.

35 g of the thus formed aluminium paste, containing 20 g of aluminium metal, were added to 200 g Dowanol DPnP and the mixture stirred for 30 mins at 25° C. To the mixture was added 8 g tetraethyl silicate and 20 g of 25% ammonia solution. The mixture was allowed to stir for 16 hours and thereafter concentrated by vacuum filtration.

The corrosion resistance of this aluminium pigment paste was tested by measuring the gas evolved when formulated in an aqueous acrylic coating system, Joncryl 537, and stored for one week at 52° C. The amount of gas evolved, for 10 g of this metallic pigment (as solids) in 150 g of Joncryl 537 and 50 g of water was 15 ml. This indicated that the aluminium flake surfaces were well protected from reaction with water.

EXAMPLE 18

The following mixture was milled for ten hours in a sealed, cylindrical pot of 30 cm diameter, set on revolving rollers. The resulting slurry was sieved to remove the grinding media.
3330 g of 3 mm diameter stainless steel balls
430 g of Dowanol DPnP
62 g of aluminium powder of approximately 7 μm median particle diameter.
4.3 g oleic acid 0.15 g octyl phosphonic acid was added to the milling fluid and the resulting slurry heated with agitation to 100° C. for 3 hrs. The mixture was thereafter cooled and concentrated by vacuum filtration.

The corrosion resistance of this aluminium pigment paste was tested by measuring the gas evolved when formulated in an acrylic coating system, Joncryl 537, and stored for one week at 52° C. The amount of gas evolved, for 10 g of this metallic pigment (as solids) in 150 g of Joncryl 537 and 50 g of water, was 12.5 ml. This indicated that the aluminium flake surfaces were well protected from reaction with water.

EXAMPLE 19

The following mixture was milled for ten hours in a sealed, cylindrical pot of 30 cm diameter, set on revolving rollers. The resulting slurry was sieved and concentrated by vacuum filtration as described in Example 1:
3330 g of 3 mm diameter stainless steel balls
428.5 g of dipropylene glycol n-propyl ether
62.2 g of aluminium powder of approximately 7 μm median particle diameter.

No lubricant was added to this mill formulation. The aluminium pigment flakes produced were incorporated into both a solvent based and a water based acrylic ink system and drawn down. A bright metallic ink, with good coverage was obtained in both systems.

35 g of the thus formed aluminium paste, containing 20 g of aluminium metal, was added to 200 g dipropylene glycol n-propyl ether and the mixture stirred for 30 mins. Added dropwise to this mixture were 12 g of a 50% solution of potassium permanganate in water. The mixture was stirred for a further 30 mins. A colour change from silver to gold was observed in the reaction slurry. The mixture was concentrated by vacuum filtration on a Buchner funnel.

EXAMPLE 20

The following mixture was milled for ten hours in a sealed, cylindrical pot of 30 cm diameter set on revolving rollers. The resulting slurry was sieved and concentrated by vacuum filtration as described in Example 1:
3330 g of 3 mm diameter stainless steel balls
428.5 g of Dowanol TPM
62.2 g of aluminium powder of approximately 7 μm median particle diameter.

35.4 g of this paste product, containing 20 g of aluminium metal, were added to 8.5 g of a low molecular weight polyethylene wax. This mixture was heated to 100° C. for 30 minutes, with gentle stirring to provide a homogenous mixture. The mixture was forced through a perforated mesh to give granules of approx. 10 mm length and 2 mm thickness. The resulting granules, containing this mix of aluminium pigment, low volatile solvent and polymer, were incorporated into polypropylene by injection moulding to form pigmented polyethylene plaques of excellent metallic appearance.

What is claimed is:

1. A process for producing a metal flake pigment composition, which comprises mechanical milling of metal powder in a milling fluid in the substantial absence of water and hydrocarbon solvents, wherein the milling fluid is both solvent and water miscible and comprises a non-aqueous, non-hydrocarbon fluid that is both solvent and water miscible, selected from ethers, ketonic species, heteroatom-containing compounds and lower mono and dialkyl ethers, esters and mixed ether esters of mono-, di- and tri-ethylene and propylene glycols.

2. The process according to claim 1, which further comprises the addition of one or more substances that act as a lubricant and/or corrosion inhibitor.

3. The process according to claim 2, wherein the corrosion inhibitor is calcium phosphate, magnesium phosphate, calcium phosphosilicate, calcium strontium phosphosilicate, aluminium zirconium zinc phosphosilicate, calcium strontium zinc phosphosilicate, alkyl and dialkyl phosphates, phosphites and their derivatives, phosphonic acid derivatives, phosphate esters of long chain ethoxylated alcohols, organic silanes or silicates, compounds of molybdenum, vanadium, titanium, zirconium, and tungsten and heteropolyanionic compounds thereof, ammonium dichromate or chromic acid.

4. The process according to claim 2, wherein the lubricant is a long chain or polymeric fatty acid, a phosphate ester of a long chain ethoxylated alcohol, lauryl phosphonic acid, lauryl phosphate or a mineral oil.

5. The process according to claim 1, which further comprises the step of removing oversize or undersize particles after milling.

6. The process according to claim 1, which further comprises concentrating after milling to a metal flake pigment paste of 50-90% metal by weight.

7. The process according to claim 6, wherein the paste is converted to a granule form.

8. The process according to claim 1, which further comprises a step of treating the milled metal flakes in the milling fluid.

9. The process according to claim 8, wherein the metal flakes are treated with a phosphate, silica, alumina, ammonium dichromate, or ammonium or potassium permanganate.

10. The process according to claim 1, wherein the metal flakes are thermally treated after the milling step.

11. The process according to claim 1, wherein the milling fluid is selected from the group consisting of gamma butyrolactone, 2-pyrrolidone, N-methylpyrrolidone, isophorone, triacetin, 2,5,hexanedione, tetraethylene pentamine, triethyl phosphate, ethyl acetoacetate, n-methyl formamide, propylene carbonate, ethylene glycol monobutyl ether, diethylene glycol monomethyl, monoethyl, monopropyl and monobutyl ethers, triethylene glycol monomethyl, monoethyl, monopropyl and monobutyl ethers, diethylene glycol dimethyl, diethyl, dipropyl and dibutyl ethers, triethylene glycol dimethyl, diethyl, dipropyl and dibutyl ethers, propylene glycol monobutyl ether, dipropylene glycol monomethyl, monoethyl, monopropyl and monobutyl ethers, tripropylene glycol monomethyl, monoethyl, monopropyl and monobutyl ethers, dipropylene glycol dimethyl, diethyl, dipropyl and dibutyl ethers, tripropylene glycol dimethyl, diethyl, dipropyl and dibutyl ethers, diamyl ether, methoxypropyl acetate, ethylene glycol monobutyl ether acetate, diethylene glycol monomethyl ether acetate, diethylene glycol monoethyl ether acetate, diethylene glycol monobutyl ether acetate, dipropylene glycol monomethyl ether acetate, propylene glycol diacetate, methyl, ethyl and propyl lactate, monomethyl, monoethyl, dimethyl and diethyl esters of succinic, glutaric and adipic acids, or a mixture of any two or more of these.

12. The process according to claim 11, wherein the milling fluid is selected from the group consisting of propylene carbonate, tripropylene glycol monomethyl ether, dipropylene glycol dimethyl ether or dipropylene glycol n-propyl ether, diethylene glycol monomethyl ether acetate, diethylene glycol monobutyl ether acetate, or mixtures of dimethyl esters of adipic, glutaric and succinic acids.

13. The process according to claim 1, wherein the metal is aluminium, zinc, copper, tin, nickel, silver, gold, iron, or an alloy thereof.

14. The process according to claim 13, wherein the metal is aluminium or gold bronze.

15. The process according to claim 1, wherein the metal pigment particles have a median diameter of 6 μm to 600 μm.

16. The process according to claim 15, wherein the metal pigment particles have a median diameter of 10 μm to 300 μm.

17. The process according to claim 1, comprising ball milling the metal powder.

18. The process according to claim 1, wherein the metal is aluminum, zinc, copper, tin, nickel, silver, gold or an alloy thereof.

19. A metal pigment paste obtained by the process of claim 1.

20. A granule produced by the process of claim 7.

21. An ink or surface coating comprising a metal pigment paste produced by a process according to claim 6 and surface coating binders, dissolved or dispersed in water, solvent or mixtures of the two.

22. An article obtained by shaping a composition comprising granules produced by the process of claim 7.

23. An article obtained by injection moulding or by extrusion of a thermoplastic, comprising granules produced by the process of claim 7.

24. A shaped article comprising a thermoplastic or thermosetting polymer and granules produced by the process of claim 7.

25. An ink or surface coating comprising granules produced by a process according to claim 7 and surface coating binders, dissolved or dispersed in water, solvent or mixtures of the two.

* * * * *